(12) United States Patent
Cuiper et al.

(10) Patent No.: US 10,890,264 B2
(45) Date of Patent: Jan. 12, 2021

(54) FLEXING SLOT FOR PLUG VALVE INSERT

(71) Applicant: Quarter Turn Pressure Control, LLC, Midland, TX (US)

(72) Inventors: Glen H. Cuiper, Haddon Township, NJ (US); Travis Harrel, Midland, TX (US); Christian Leuchtenberg, Singapore (SG)

(73) Assignee: Quarter Turn Pressure Control, LLC, Midland, TX (US)

( * ) Notice: Subject to any disclaimer, the term of this patent is extended or adjusted under 35 U.S.C. 154(b) by 0 days.

(21) Appl. No.: 16/178,423

(22) Filed: Nov. 1, 2018

(65) Prior Publication Data

US 2020/0025296 A1 Jan. 23, 2020

Related U.S. Application Data

(60) Provisional application No. 62/699,641, filed on Jul. 17, 2018.

(51) Int. Cl.
   *F16K 5/04* (2006.01)
   *F16K 5/16* (2006.01)

(52) U.S. Cl.
   CPC .......... *F16K 5/0407* (2013.01); *F16K 5/0471* (2013.01); *F16K 5/168* (2013.01)

(58) Field of Classification Search
   CPC .... F16K 5/0407; F16K 5/0207; F16K 5/0257; F16K 5/0271; F16K 5/0264; F16K 5/168; F16K 5/0457; F16K 5/0464; F16K 5/0471; F16K 5/02; F16K 5/04
   See application file for complete search history.

(56) References Cited

U.S. PATENT DOCUMENTS

| | | | |
|---|---|---|---|
| 3,479,006 A * | 11/1969 | Brown | F16K 5/184 251/174 |
| 6,398,225 B1 * | 6/2002 | Hanson | F16K 5/0271 251/314 |
| 8,171,958 B2 * | 5/2012 | Morreale | F16K 3/24 137/614.16 |
| 9,897,223 B1 * | 2/2018 | Roberts | F16K 5/0471 |
| 2003/0151016 A1 * | 8/2003 | Neal | F16K 5/0471 251/309 |
| 2009/0032764 A1 * | 2/2009 | Morreale | F16K 3/32 251/366 |
| 2016/0201811 A1 | 7/2016 | Hunter et al. | |
| 2017/0184209 A1 * | 6/2017 | Landrum | F15B 11/00 |
| 2018/0073654 A1 * | 3/2018 | Nowell | F16K 5/0471 |
| 2018/0266573 A1 * | 9/2018 | Nowell | F16J 15/062 |

\* cited by examiner

*Primary Examiner* — Kelsey E Cary

(57) ABSTRACT

An insert adapted for use in a plug valve includes a single-piece body having an inner sidewall adapted to interface with a sidewall of a valve plug. First and second opposing apertures are each defined through the single-piece body for selective alignment with a flow bore of the valve plug. First and second opposing slots are each defined through the single-piece body at an angle to the first and second opposing apertures for allowing the body to flex in the direction of the first and second opposing apertures.

16 Claims, 7 Drawing Sheets

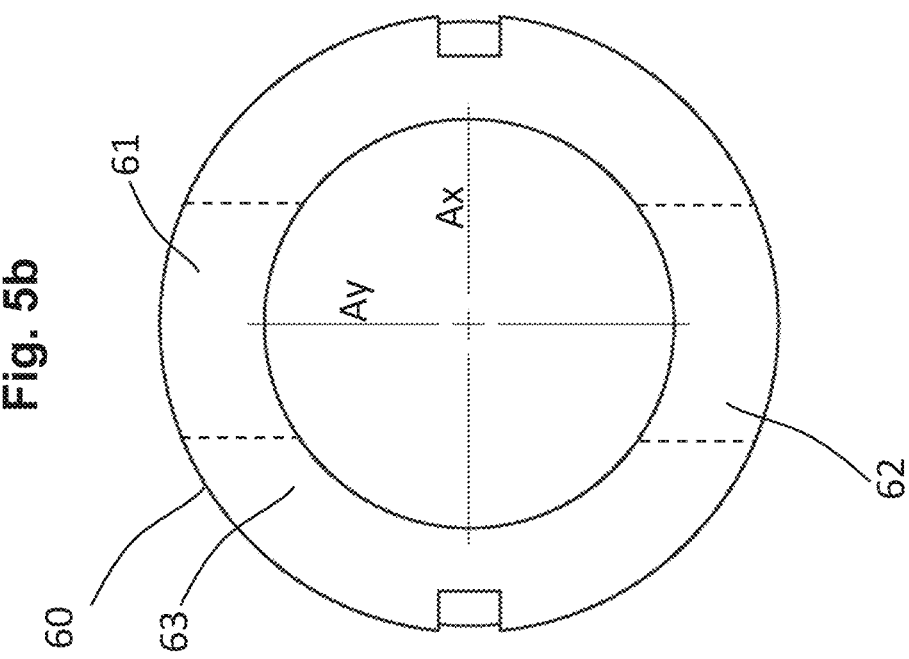
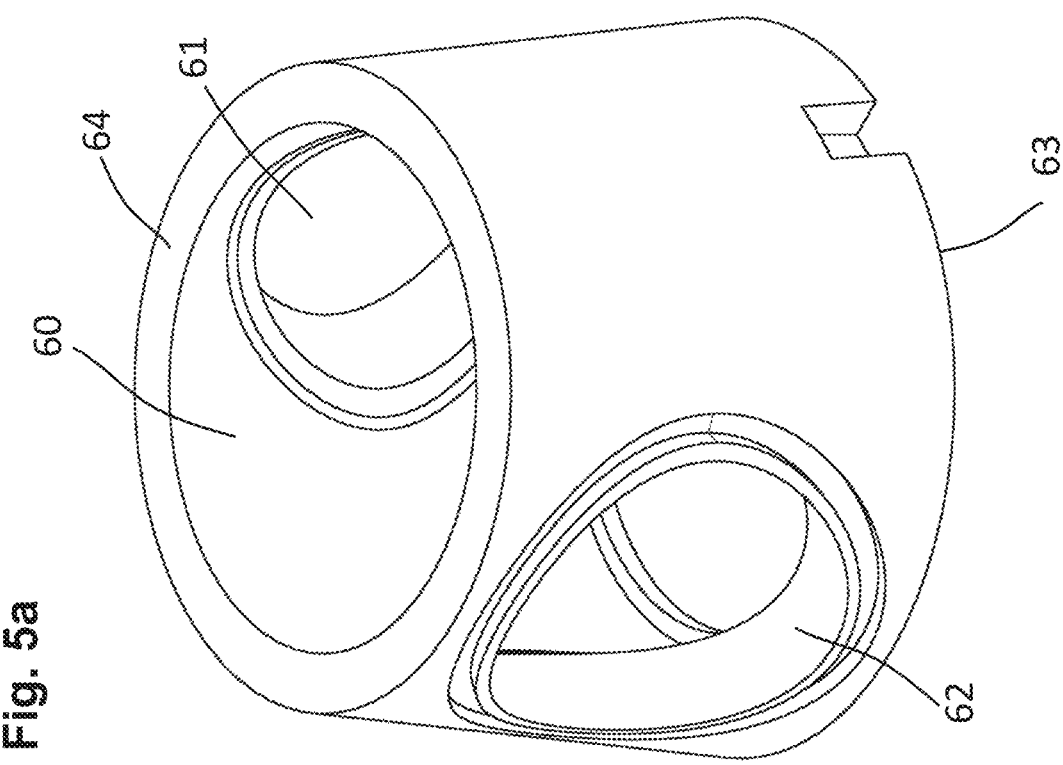

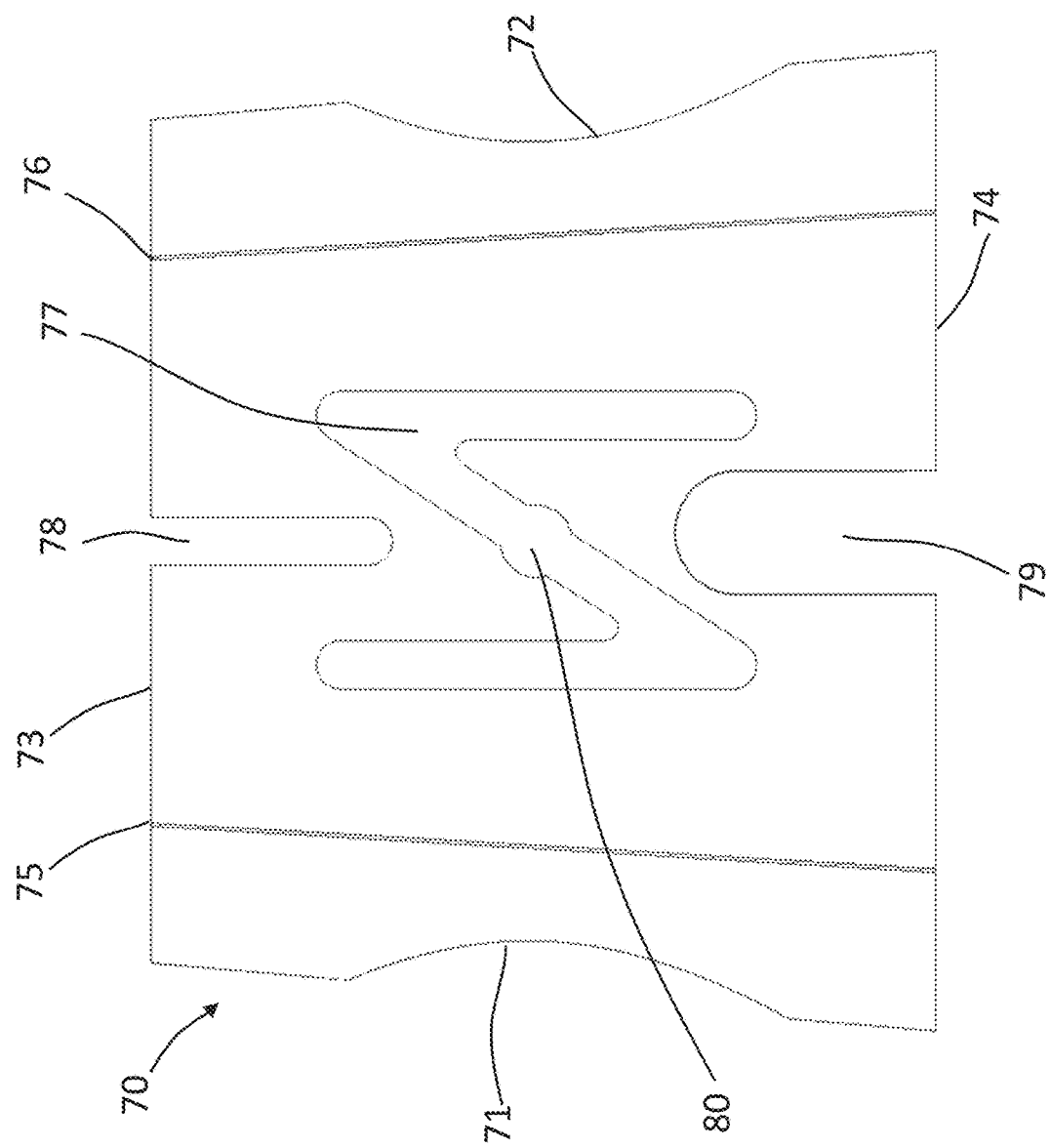

FLEXING SLOT FOR PLUG VALVE INSERT

CROSS-REFERENCE TO RELATED APPLICATION

The present application claims the benefit of U.S. Provisional Patent Application Ser. No. 62/699,641, filed Jul. 17, 2018, which is incorporated herein by reference in its entirety for all purposes.

FIELD OF INVENTION

This invention relates in general to fluid drilling equipment and in particular to high pressure valves subjected to severe operating conditions, such as the high pressures, high flow rates, and abrasive fluids commonly found in hydraulic fracturing operations and other oil and gas drilling applications.

BACKGROUND OF INVENTION

Plug valves have a service life that is limited by the condition of the main body. Internal parts can be replaced but eventually the deterioration of the sealing insert to main body interface, due to corrosion, wear, erosion and eventual washout, which leads to an unusable main body. The damaged main body typically needs to be repaired in an intrusive manner such as welding. The root cause of this deterioration is the inherent design of these types of valves, which including small gaps between the internal sealing parts that allow movement of the main sealing interface (i.e., the rotation of a plug between the inserts in a plug valve). Without these gaps plug will lock-up due to friction. The tolerances of these gaps are also affected by the temperature and/or pressure inside the valve.

In one of the most severe service applications known today, hydraulic fracturing ("fracing"), very high pressure slurry is pumped through these valves at very high rates. In fracing, fracing slurry is forced down a wellbore with enough pressure to fracture the hydrocarbon bearing rock formations and force particulates into the resulting cracks. When the pressure is released, the particles ("proppant"), which may be sand or other high compressive strength additives such as ceramic particles and bauxite, remain in the factures (cracks) and keep the fractures open. This "mechanism" then allows pathways for hydrocarbon to flow from the rock that was previously solid. The particle size distribution in these facing fluids is distributed so that the larger particles can prop open larger cracks and finer particles can prop open the very tips of the cracks, which are microscopic in nature. The particle sizes can vary from 0.004 inches to 0.01 inches (No 140 Mesh to No 8 Mesh). The pumping pressure at the valve can be up to 15,000 psi and the slurry velocity through a valve bore of 5.125 inches, as is typical of a 5⅛ inch, 15000 psi valve, is well above erosional velocity of about 50 to 70 feet per second. Moreover, the fracing is typically preceded and followed by an acid wash of 15% hydrochloric acid, which accelerates corrosion.

As one skilled in the art of mechanical engineering can ascertain, the fracing "mechanism" will inject proppant particles into any crack, orifice or possible leak path in the valve assembly. The injected particles remain in the valve assembly when the pressure is released. Small particles as large as 0.004 inches are within machining tolerances of steel parts and therefore will find their way into metal sealing surfaces. With the high velocity of abrasive fracing fluid, any weakness or point of turbulence can very quickly lead to a washout of a seal area or any interface. If an area or interface adjoins the valve main body, then the life of the main valve body is severely limited.

To preserve the main moving sealing parts and to allow them to seal effectively, very high viscosity sealing greases are injected and the plug valves are greased as many times as practicable on a job. Greasing forces the proppant out of the interfaces to allow effective sealing and prevent scouring of the seal surfaces with trapped particles. Even with this procedure, the moving sealing faces have a very limited service life and are replaced frequently.

The traditional design of tapered plug valves with cylindrical plugs and tapered inserts has been to make the tapered insert out of a single piece which has worked successfully for smaller valve sizes. On larger plug valves the industry has moved towards split tapered inserts which provide better sealing at high pressures but also create other issues. The design of tapered plug valves requires that to ensure a good seal from the insert to the valve body that the shape is exactly the same i.e. same concentricity of taper on outside with respect to tapered valve cavity. For the insert to body seal an O-ring or other seal(s) is used so some small tolerances in lack of concentricity are possible.

For sealing between the perfectly cylindrical plug and the equivalent perfect cylindrical inside of the tapered insert the tolerances have to be extremely small as no O-ring is typically used on most fracing valve designs and the interference gap is filled with viscous sealing grease. The typical machining process involves machining the inserts from a single piece which is then split into two pieces by cutting. This cutting releases hoop stresses in the part and results in the two separate parts (inserts) not having the exact same concentricity dimensions as the original part.

The problem just described is exacerbated when using high tensile corrosion resistant alloys like 4340 alloy steel or 17-4PH stainless steel for making inserts. This has led to the use of lower grade materials like ductile iron as they have less "spring" i.e. stored hoop stresses in the original full insert. These lower grade steels like the ductile iron are softer and wash-out easily leading to consequential washout and failure of more expensive parts like the plug and sometimes the body of the valve.

Application US 2016/0201811, assigned to GE, discloses slots cut into a single piece insert, which allow fine adjustment of the diameter of the insert to optimize sealing gaps. In particular, for a single insert (sleeve) design, one or more axially orientated cuts in the sleeve to allow the sleeve to expand in a hoop direction. This solution however creates a high friction interface with the plug and also does not solve the problem of ensuring optimum sealing.

There are significant advantages to using a single insert as discussed below. Hence, what is needed is a solution to the problem of effectively minimizing the sealing gap between the insert and the plug without introducing other undesirable variables compared to prior art designs.

SUMMARY OF INVENTION

One embodiment of the present inventive principles is a high pressure plug valve consisting of a cylindrical plug with a single tapered insert, which has slots enabling a preferential deflection in the same axis as the fluid bore to ensure optimum sealing characteristics. In some embodiments, the tapered insert is machined out of a single piece of high grade steel and is used without being cut in half. Preferably, equal slots are machined into the insert on opposing sides, thereby allowing the transverse opposing sides of the insert, which create the sealing interfaces between plug and valve body, to flex (i.e. move in a transverse direction parallel to the bore). Advantageously, the flexible single insert retains the exact concentricity required on internal and external faces, which gives the same sealing performance as split inserts without the twisting that is detrimental to the sealing performance.

According to the inventive principles, the slots are cut in a pattern that allows for maximum deflection in the axis while retaining top and bottom cylindrical profiles of the insert in the same plane with minimal to no deflection. This enables this single slotted insert to combine the optimal characteristics of both singular and split insert designs, leading to an improved seal performance of the valve. The inventive principles are described in detail for a tapered insert type plug valve, but can also be equally applied to cylindrical plug valve designs.

A design method is described that can be used to design the correct flex without allowing the residual stress in piece affect the concentricity of the piece with respect to the operational valve bore.

BRIEF DESCRIPTION OF DRAWINGS

For a more complete understanding of the present invention, and the advantages thereof, reference is now made to the following descriptions taken in conjunction with the accompanying drawings, in which:

FIG. 2b is a prior art schematic cross section detail of the view in FIG. 2a;

FIG. 5a is a schematic isometric view of a single insert of a prior art plug valve insert and FIG. 5b is an end view of same;

FIG. 7 is a schematic side view of an optimized single insert with slots cut into it for an exemplary plug valve embodying the principles of the present invention.

DETAILED DESCRIPTION OF THE INVENTIONS

The problems being solved and the solutions provided by the embodiments of the principles of the present inventions are best understood by referring to FIGS. 1 to 7 of the drawings, in which like numbers designate like parts.

Figure 1:
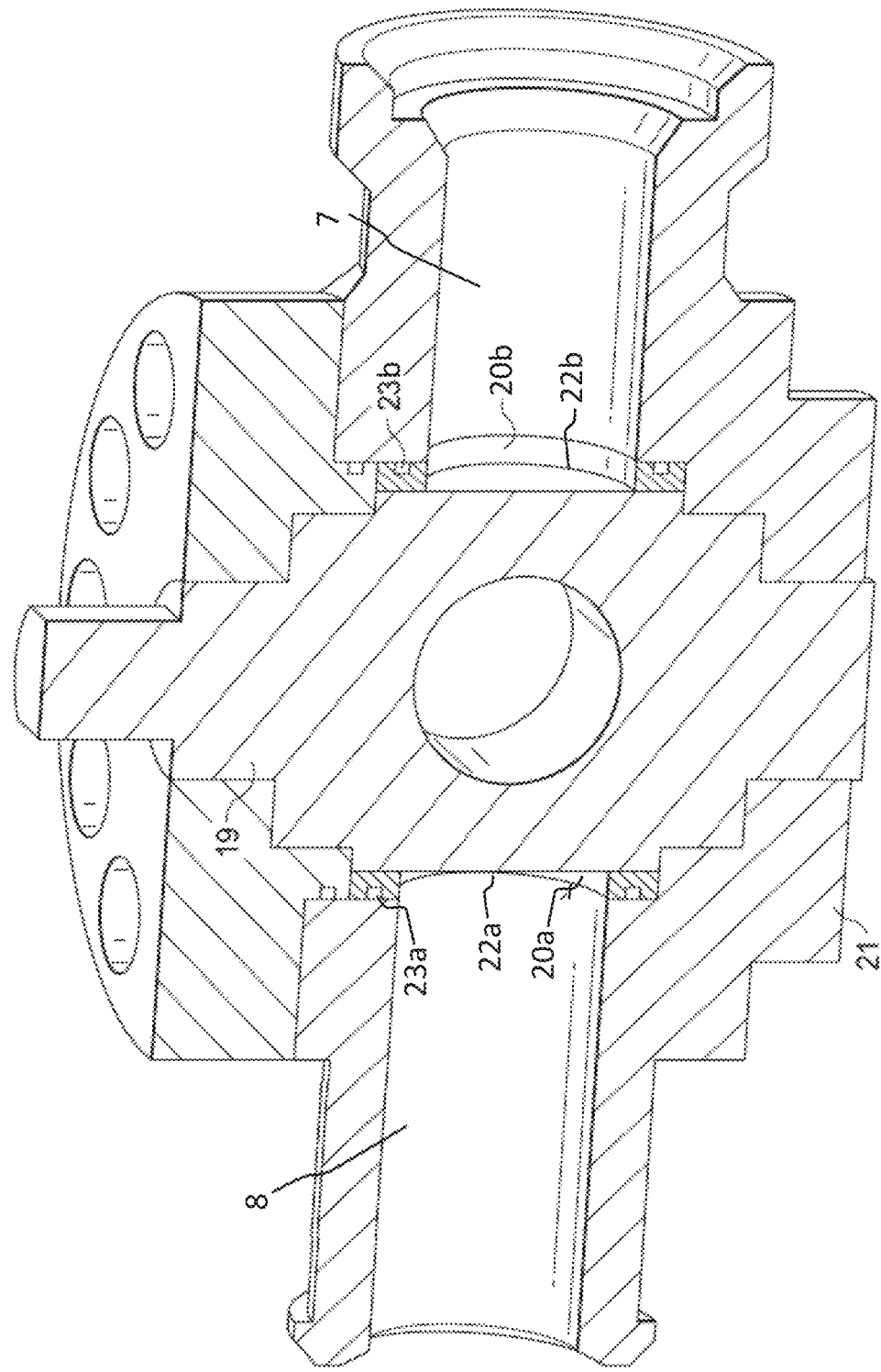
FIG. 1 is a schematic side cross-sectional view of a prior art cylindrical plug valve.

FIG. 1 is a schematic cross-sectional side view of a prior art cylindrical design plug valve having a cylindrical plug 19 sealing in a rotating fashion against two stationary split inserts 20a and 20b. These inserts 20 are sealed against the body 21 and have a tolerance gaps at 22a, 22b to allow the plug 19 to move rotationally with respect to the inserts 20. The inserts 20 are sealed against the body 21 with seals 23a, 23b and they are stationary relative to the body. As the seal between the inserts 20 and the body 21 is affected by elastomeric seals 23, the gap and perfect alignment of the inserts 20 with respect to the body 21 is not critical, though of course it must be sufficiently small to avoid extrusion of the seals under pressure. The seal between the plug 19 and the inserts 20 is a metallic seal with no elastomers, aided by viscous sealing grease injected into the valve cavities (detail not shown). The sealing effectiveness of the valve in the closed position depends on the ability of the design to minimize the gaps 22a and 22b between the plug 19 and inserts 20 when pressure is applied to the bore either downstream 7 or upstream 8 of the plug 19 which is shown in closed position. When pressure is applied to the bore 7 then the gap 22a must be minimized and conversely when pressure is applied to bore 8 then gap 22b must be minimized. As the plug 19 and body 21 are significantly bigger and thicker in cross section compared to the inserts 22a and 22b, the design requires a small amount of flex of the inserts 22a and 22b. In the large bore high pressure plug valves used for fracing, the abrasive nature of the medium dictates that the body and plug are made of high strength alloy steel and the inserts are made of a metallic material like ductile iron or nickel aluminum bronze. The capability to flex under pressure to maximize sealing effectiveness is one aspect of the inventive principles, as discussed further below. In particular, the ability of the insert(s) to flex in the correct axis is an advantageous feature of the inventive principles.

Figure 2A:
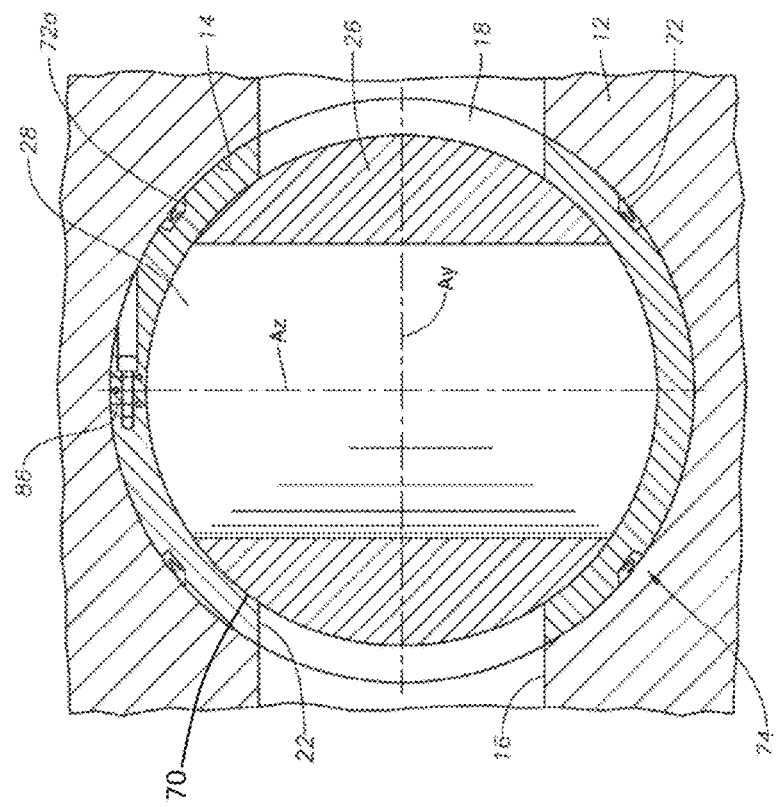
FIG. 2a is prior art schematic top cross-sectional view of another prior art design of a plug valve.
Figure 2B:
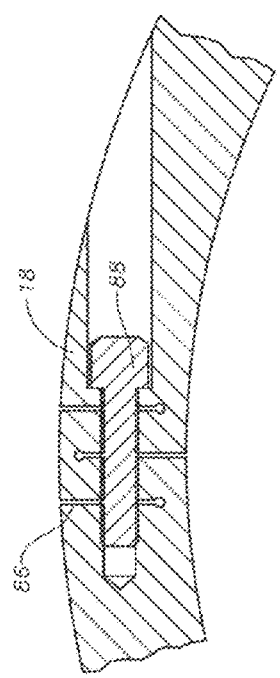

FIGS. 2a and 2b are schematic top cross-sectional view of another design of a prior art plug valve that attempts to use a type of slot adjustment mechanism to improve the sealing characteristics of the valve. FIG. 2a shows a valve body 12 with seal assembly 74 consisting of a single insert (sleeve) 18 and a plug 26 that is closed. The sleeve 18 is stationary relative to the body 74 and sealed on the interface 14 with circular seals 72 and 72a. The sleeve 18 is allowed to flex by one or more cuts 86 that extend the full height of the sleeve, as shown in further detail in FIG. 2b. An adjustment mechanism 88 controls the sleeve flex so that sleeve 18 can be optimized to minimize the gap 70 between the sleeve 18 and the plug 26. This allows for a very tight fit, which depends substantially on the actual flexibility of the sleeve 18.

As one skilled in the art of mechanical engineering, the increase in the gap 70 created on axis Az by the slots 86 and adjustment mechanism 88 does not translate into an equal distribution of flex or gap between the semicircular section of sleeve 18 above the Ay axis, as compared to the semicircular section below the Ay axis. Also, this type of design only works, as is explained in application US 2016/0201811 assigned to GE, by the introduction of low friction polymer coatings. These coatings do not hold up well in fracing conditions and once fine sand particles enter the perimeter of this interface friction increases and deterioration of the sealing capability occurs. The fracing industry moved away from these types of full contact designs years ago with the introduction of the U.S. Pat. No. 6,655,658 B2 by Neal et al., assigned to Halliburton, which shows a tapered plug valve with a split insert design that was so successful that it has been copied across multiple designs after the patent expiration and is the most widely used design in use for fracing today.

Figure 3:
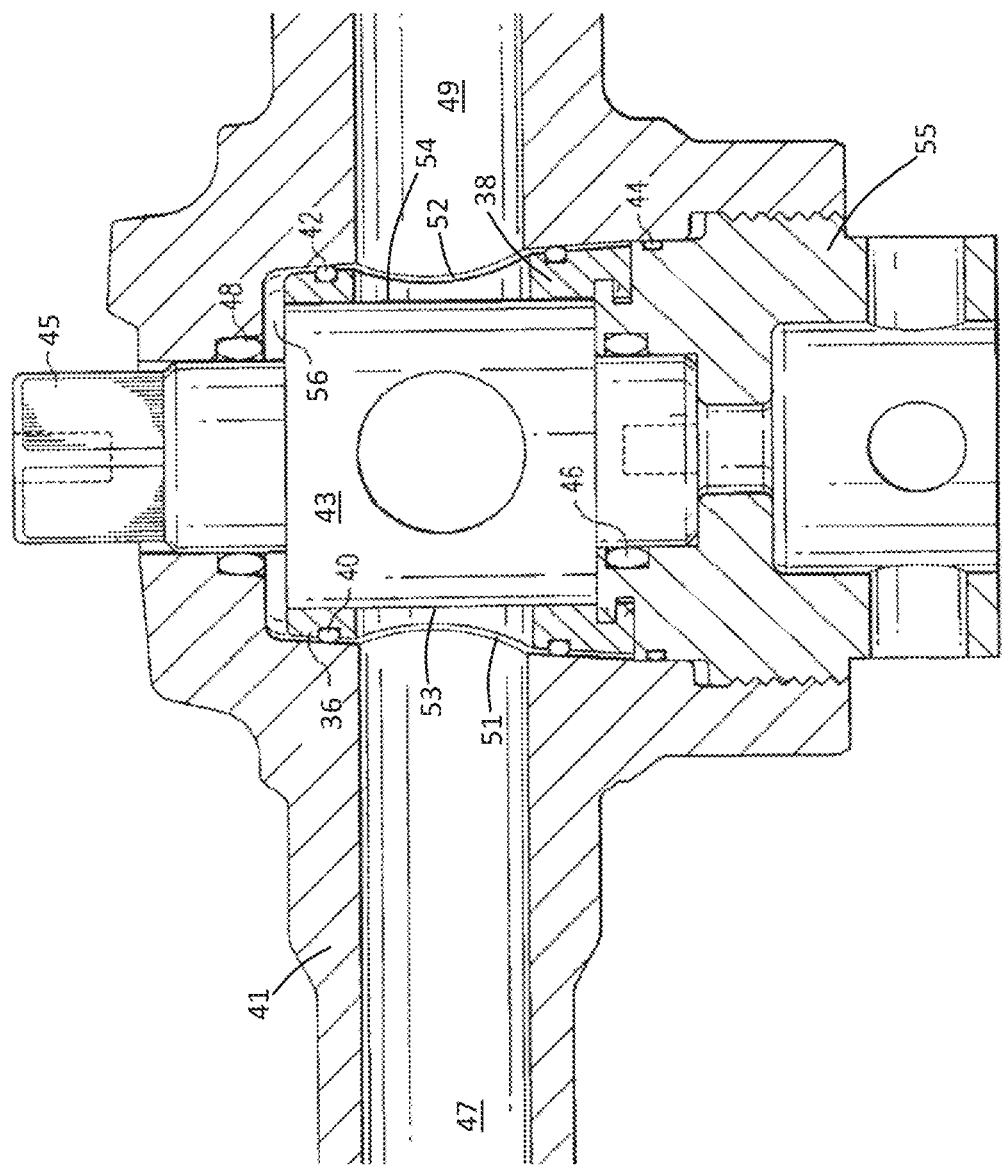
FIG. 3 is a schematic side cross-sectional view of a prior art tapered plug valve.

A cross section of the complete plug valve assembly of U.S. Pat. No. 6,655,658 is shown in FIG. 3, which includes an upstream bore 47 and a downstream bore 49. The body 41 of the valve has a tapered cavity into which two separate inserts 36 and 38 are installed. The inserts are sealed against the body with circular seals 40 and 42. A cylindrical plug 43 is sealed against the body with seals 46 and 48 on its shafts. The plug, shown in the closed position, can be rotated via a hexagonal end 45. As the FIG. 3 shows, gaps 51, 52 exist between the inserts 36, 38 and the body 41, which are sealed by the elastomeric seals 40 and 42. At the interfaces between the plug 43 and the inserts shown as 53 and 54, a metal to metal seal is affected aided by sealing grease that is injected into cavity 56. These gaps 53 and 54 are minimized by pushing on the tapered inserts 36 and 38 with the nut 55, which is threaded into the body 41 and sealed against the body with seal 44.

In the geometry of the valve of FIG. 3, there is a much larger opening on the nut side, as exemplified by the larger diameter seal 44 compared to the shaft seal 48. In fact, this valve has significantly unequal cavity openings, with the cavity at the top of the drawing being much smaller than the cavity at the bottom of the drawing. For one skilled in the art of mechanical engineering, this means that under high pressure there will be a much greater deflection of the valve body on the bottom nut side compared to the top. This problem is exacerbated for the larger bore and higher-pressure valves being used for fracing, which leads to leaks across the interfaces 53 and 54.

Figure 4:
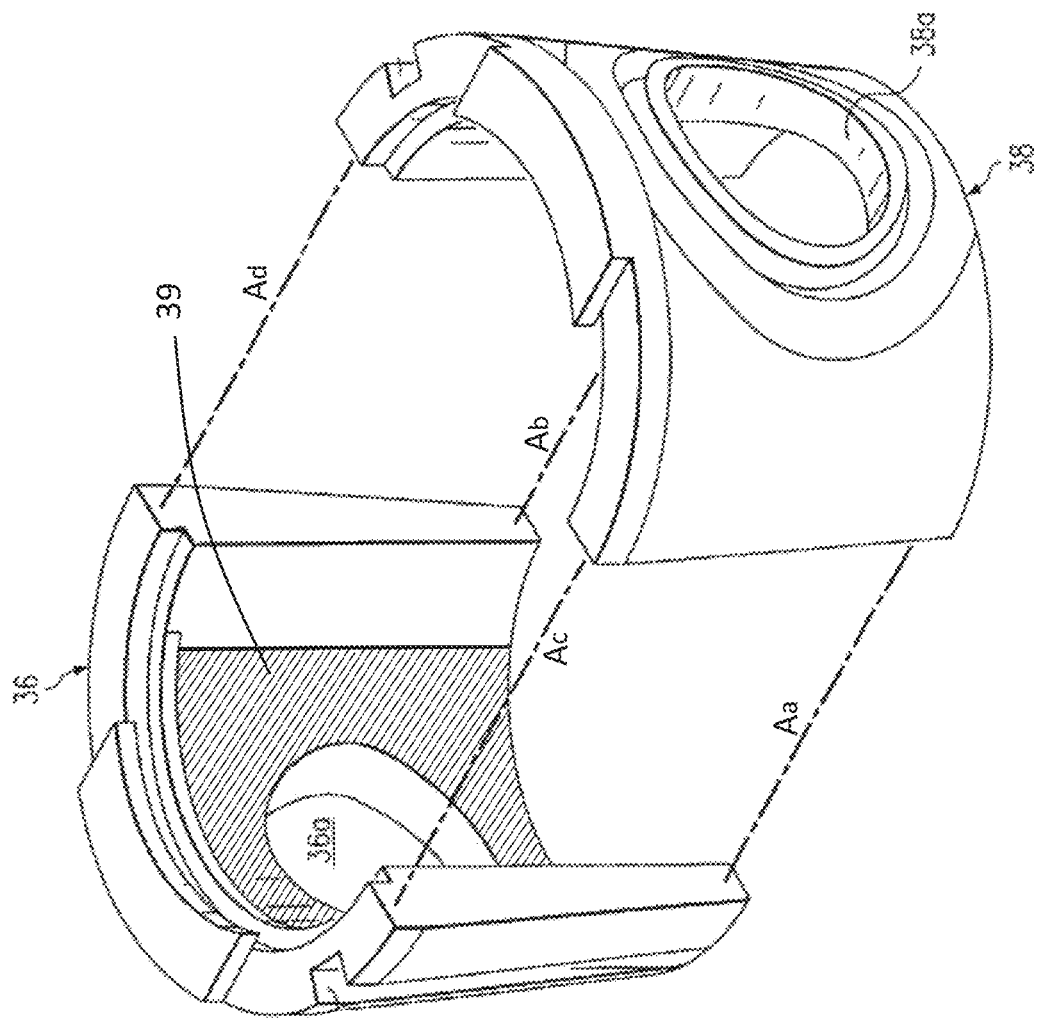
FIG. 4 is a schematic isometric view of the prior art split insert design from the tapered plug valve depicted in FIG. 3.

FIG. 4 shows the detail of the split inserts 36 and 38 of FIG. 3 in an exploded view for clarity. In order to minimize the flex affecting the seal, this design has reduced the contact interface 53 between the insert 36 and the plug (not shown) to a small raised area 39. The two semi-circular tapered inserts 36 and 38 have through openings 36a and 38a which correspond to the bore of the valve body (not shown). When they are inserted into the tapered body, inserts 36 and 38 wedge together onto the plug 43, which is evenly cylindrical. The inserts 36 and 38 are also cylindrically shaped on the inside, but only the slightly raised (shaded) surface 39 shown on the inside of insert 36 is in direct contact with the plug 43 surface. The rest of the inside of the insert 36 has been slightly undercut so that it does not contact the plug 43 at all. The same features are on the inside of insert 38 (not visible in this depiction). This allows all of the contact force between the plug 43 and the insert 36 and 38 to be spread over a smaller area, which results in correspondingly higher contact pressure that aids in the sealing process. There are at least two significant problems with this prior art design.

Firstly, in the typical manufacturing process, the inserts 36 and 38 are machined from a single piece, so that the critical sealing face 39, on the internal sides of both the inserts 36 and 38, can be accurately machined. Later, the single machined insert is cut in half. Typically, the materials used are ductile iron or Nickel Aluminum Bronze, which have little residual stresses after machining and can easily be stress relieved. However, for the very high pressure valves used for fracing operations, attempts at replicating this manufacturing process with higher tensile materials has not been successful, due to the difficulty of controlling spring (i.e. the residual hoop stresses that are released after cutting). Stress relieving has also not successfully avoided this problem, which results in non-concentric shapes with respect to valve cavity taper and plug diameter.

The second problem is that by having the inserts 36 and 38 separated, which on the one hand improves the sealing performance compared to leaving the insert as a single piece, the inserts 36 and 38 are allowed move unevenly with respect to the valve body when the valve cavity is under high pressure. This problem is due to non-symmetrical shape of the valve cavity, which has a large opening on one side for installation of the plug 43 and inserts 36 and 38 and a small opening for the valve shaft on the opposing side.

Consequently, more movement takes place along the axes Ac and Ad of FIG. 4 compared to axes Aa and Ab, which results in a loss of concentricity of the inserts 36 and 38 compared to the plug 43. In practice, as the inserts 36 and 38 are able to move fully independently, they are also able to twist, which occurs if the movement between the Ac and Ad axes is not the same, or for that matter the movement between the axes Aa and Ab is not the same. This causes leaks to occur, as evidenced by washouts (localized erosion).

Therefore, in a plug valve, what is key is for the insert flex to occur in such a way so that the sealing area is always perfectly concentric to the plug and in full contact with the corresponding area on the plug. The plug and inserts may move under high pressure conditions, depending on which side of the bore pressure is applied, but the desired result needs to be to maintain the critical contact areas and be equivalent on both sides of the plug.

FIGS. 5a and 5b are respectively perspective elevational and bottom end views of an insert machined out of a single piece. While single-piece inserts have been tried successfully on smaller valve sizes, when going to the larger bore valves and higher pressures required in fracing, more deflection of the valve body occurs, causing leaks. In this case, the insert 60 is tapered with bore cutouts 61 and 62 corresponding to the valve bore. Because of the differences between this shape and the more complex shape of the valve body, the metal of the insert 60 does not deflect in the same way as that of the valve body. In particular, because the insert 60 is smaller in diameter, with a thinner cross-section, at the top 64 and thinner in diameter, with a thicker cross-section, at the bottom 63, the insert 60 will not deflect evenly at the top compared to the bottom. This aspect affects the concentricity with respect to the plug, which being perfectly cylindrical and symmetrical across the bore, will behave in a much more uniform way.

Looking at the bottom end view in FIG. 5b, the preference would be for the insert to flex in the Ay axis compared to the Ax axis. In fact, the insert 60 should flex more in the Ay axis at the bottom 63 of the insert 60 compared to the flex at the top of the insert 64 in the same Ay axis. Due to the variation in diameters and cross sections between the top 64 and bottom 63, this is a difficult problem to solve, hence an inadequate solution.

Figure 6:
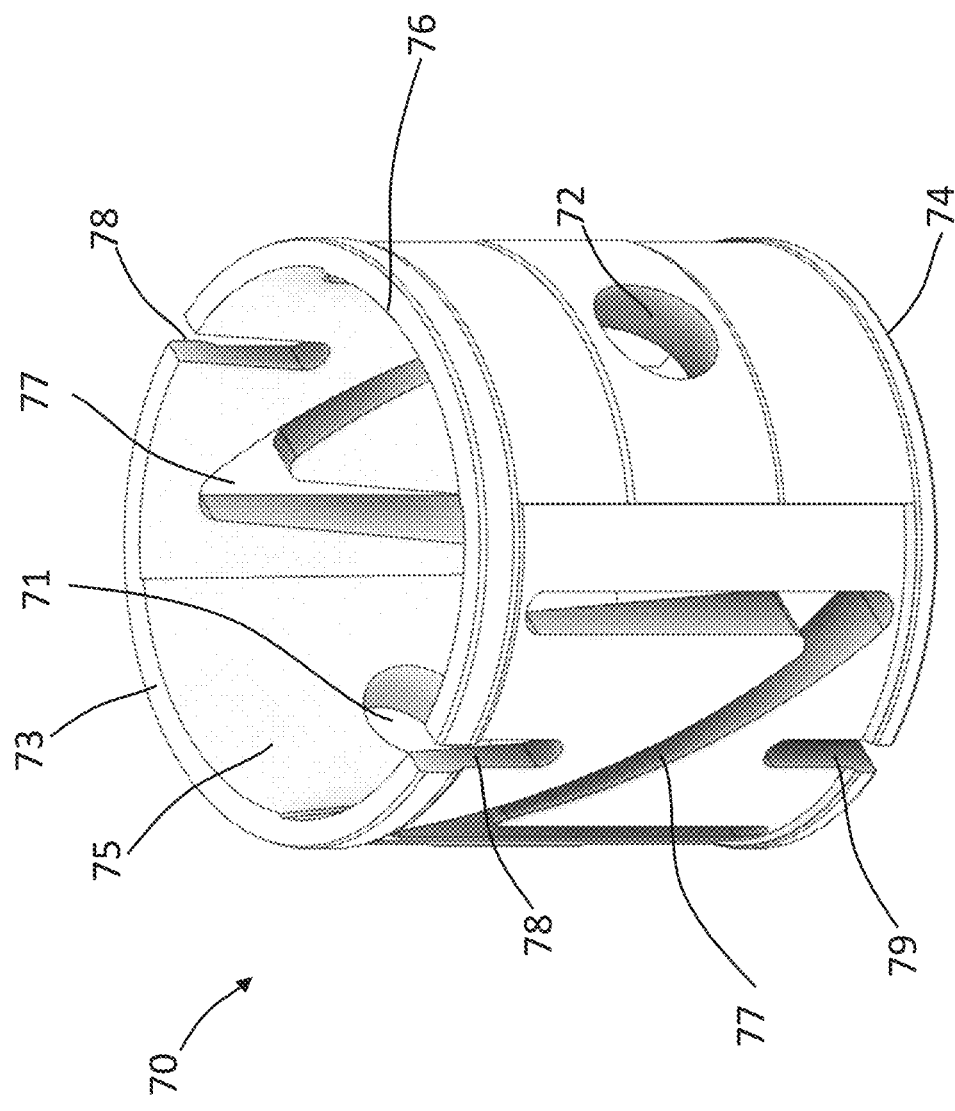
FIG. 6 is a schematic isometric view of a single insert with slots cut into it for an exemplary plug valve embodying the principles of the present invention.

Referring now to FIG. 6, a solution to this problem is shown according to the present inventive principles. FIG. 6 is a schematic isometric view of a single piece insert 70, which includes bores 71 and 72 corresponding to the valve bore and is tapered from top 73 to bottom 74, with the bottom 74 being wider. The insert 70 has an internal raised face 75 that is substantially perfectly cylindrical with respect to the cylindrical outer surface of the valve plug (not shown). A corresponding raised cylindrical face 76 is on the opposite side. In this way, the sealing face to plug interface is similar to that of the split insert face 39 depicted in FIG. 4.

The sleeve 70 has two Z shaped slots 77 cut into opposing sides at 90 degrees to the bore openings 71, 72 as well as two slots 78 in the top circumference of sleeve also exactly at 90 degrees to the bore openings. A further two slots 79 (only one shown) are cut also at exactly 90 degrees to the bore openings. This innovation allows the sealing insert 70 to flex preferentially in the same axis as the bores 71 and 72. The Z-slots 77 allow the preferential flex along the bore axis, while allowing the insert 70 to still retain the shape rigidity required to stop excessive twisting by retaining a continuous, though not even, hoop of metal near the top and bottom of the insert.

As discussed earlier, the exact deflection required depends on the flex of the valve body under pressure. As the valve body is not symmetrical for tapered plug valves, the deflection of the single piece insert 70 must be matched to that of the valve body to ensure exact concentricity of the plug to the inner faces 75 and 76 for optimum sealing, depending on which side of the valve bore has pressure.

This complex interaction can be modelled using computer programs carrying out Finite Element Analysis. A valve model is built, and the valve body is subjected to a simulated pressure. The single piece insert 70 is modelled with a Z slot and then an optimization exercise is carried out adjusting the dimensions and positions of slots 77, 78 and 79 until the insert provides the exact required deflection.

Such an optimization exercise has been carried out in FIG. 7 which shows a side view of an optimized insert 70 after using the method just described. Like numbers are used for this drawing. In this example, the Z-slot 77 shown is smaller in size and more compressed in the horizontal axis. An additional flex enhancement is the circular slot 80 at the center of the Z-slot. The top slot 78 on the upper part 73 is narrower than the bottom slot 79 on the bottom rim 74 of the insert 70. These optimizations allow this particular insert to flex in accordance and unison with the valve body to ensure perfect concentric interfaces of the internal faces 75 and 76 with respect to the cylindrical plug thus ensuring optimum sealing. Other slot solutions are possible in accordance with the present principles to achieve the same objective Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. An insert adapted for use in a plug valve comprising:
a single-piece body having an inner sidewall adapted to interface with a sidewall of a valve plug, first and second opposing apertures are each defined through the single-piece body for selective alignment with a flow bore of the valve plug, and first and second opposing slots are each defined through the single-piece body at an angle to the first and second opposing apertures for allowing the body to flex in a direction of the first and second opposing apertures;
wherein:
the single-piece body comprises first and second opposing rims spaced by a central body portion; and
the first and second opposing slots extend inward from a selected one of the first and second rims into the central body portion; and
further comprising third and fourth opposing slots extending inward from another one of the first and second rims into the central body portion.

2. The insert of claim 1, wherein the first and second slots are narrower than the third and fourth slots.

3. An insert adapted for use in a plug valve comprising:
a single-piece body having an inner sidewall adapted to interface with a sidewall of a valve plug, first and second opposing apertures are each defined through the single-piece body for selective alignment with a flow bore of the valve plug, and first and second opposing slots are each defined through the single-piece body at an angle to the first and second opposing apertures for allowing the body to flex in a direction of the first and second opposing apertures;
wherein:
the single-piece body comprises first and second opposing rims spaced by a central body portion; and
the first and second slots comprise z-shaped slots defined through the central body portion.

4. The insert of claim 3, wherein first and second opposing slots are each defined through the body at an angle to the first and second opposing apertures of ninety degrees.

5. The insert of claim 3, wherein the single-piece body comprises first and second opposing rims spaced by a central body portion, the first rim having a first circumference and the second rim having a second larger circumference such that the single-piece body tapers between the first and second rims.

6. The insert of claim 5, wherein the first and second opposing slots are each further defined through the body at an angle to the first and second opposing apertures to minimize twisting of the tapered single-piece body.

7. The insert of claim 3, wherein at least one of the z-shaped slots comprises a circular portion.

8. An insert adapted for use in a plug valve comprising:
a single-piece body having an inner sidewall adapted to interface with a sidewall of a valve plug, first and second opposing apertures are each defined through the single-piece body for selective alignment with a flow bore of the valve plug, and first and second opposing slots are each defined through the single-piece body at an angle to the first and second opposing apertures for allowing the body to flex in a direction of the first and second opposing apertures;
wherein:
the single-piece body comprises first and second opposing rims spaced by a central body portion;
the first and second opposing slots extend inward from a selected one of the first and second rims into the central body portion; and
third and fourth opposing slots each having a z-shape are defined through the central body portion.

9. A plug valve comprising:
a valve body;
a plug having a flow bore; and
a sealing insert supported by the valve body and through which the plug rotatably extends, comprising:
a single-piece body having an inner sidewall adapted to interface with a sidewall of the plug, first and second opposing apertures are each defined through the single-piece body for selective alignment with the flow bore of the plug when the valve is in an open position, and first and second opposing slots are each defined through the single-piece body at an angle to the first and second opposing apertures for allowing the body to flex in a direction of fluid flow when the first and second opposing apertures are aligned with the flow bore of the plug;
wherein:
the single-piece body comprises first and second opposing rims spaced by a central body portion; and
the first and second opposing slots extend inward from a selected one of the first and second rims into the central body portion; and further comprising third and fourth opposing slots extending inward from another one of the first and second rims into the central body portion.

10. The plug valve of claim 9, wherein the first and second slots are narrower than the third and fourth slots.

11. The plug valve of claim 9, wherein the first and second slots each have a U shape.

12. A plug valve comprising:
a valve body;
a plug having a flow bore; and
a sealing insert supported by the valve body and through which the plug rotatably extends, comprising:
a single-piece body having an inner sidewall adapted to interface with a sidewall of the plug, first and second opposing apertures are each defined through the single-piece body for selective alignment with the flow bore of the plug when the valve is in an open position, and first and second opposing slots are each defined through the single-piece body at an angle to the first and second opposing apertures for allowing the body to flex in a direction of fluid flow when the first and second opposing apertures are aligned with the flow bore of the plug;
wherein:
the single-piece body comprises first and second opposing rims spaced by a central body portion; and
the first and second slots comprise z-shaped slots defined through the central body portion.

13. The plug valve of claim 12, wherein first and second opposing slots are each defined through the body at an angle to the first and second opposing apertures of ninety degrees.

14. The plug valve of claim 12, wherein at least one of the z-shaped slots comprises a circular portion.

15. The plug valve of claim 12, wherein the single-piece body is tapered with a tapered inner sidewall adapted to interface with a tapered sidewall of the plug, wherein the first and second opposing slots are each further defined through the single-piece body at an angle to the first and second opposing apertures to minimize twisting of the tapered single-piece body.

16. A plug valve comprising:
a valve body;
a plug having a flow bore; and
a sealing insert supported by the valve body and through which the plug rotatably extends, comprising:
a single-piece body having an inner sidewall adapted to interface with a sidewall of the plug, first and second opposing apertures are each defined through the single-piece body for selective alignment with the flow bore of the plug when the valve is in an open position, and first and second opposing slots are each defined through the single-piece body at an angle to the first and second opposing apertures for allowing the body to flex in a direction of fluid flow when the first and second opposing apertures are aligned with the flow bore of the plug;
wherein:
the single-piece body comprises first and second opposing rims spaced by a central body portion;
the first and second opposing slots extend inward from a selected one of the first and second rims into the central body portion; and
third and fourth opposing slots each having a z-shape are defined through the central body portion.

* * * * *